Oct. 25, 1966     A. F. DAVENPORT     3,280,483

TEACHING AID AND INSTANT SELF-CORRECTING RESPONSE DEVICE

Filed Feb. 21, 1966

INVENTOR.
ALVAN F. DAVENPORT
BY
Warren, Brosler, Cypher and Anglim
ATTORNEYS

United States Patent Office 3,280,483
Patented Oct. 25, 1966

3,280,483
TEACHING AID AND INSTANT SELF-CORRECTING RESPONSE DEVICE
Alvan F. Davenport, 3404 Morningside Drive, Richmond, Calif.
Filed Feb. 21, 1966, Ser. No. 528,945
6 Claims. (Cl. 35—48)

This invention relates to devices which primarily are aids to the learning process and are also useful in determining how much a person has learned. Specifically, the invention is a multiple choice response device providing instant information concerning the correct answer after a choice has been made by the responder.

An object of this invention is to provide a new and useful teaching aid.

Another object is to provide a device which will provide the user a place to mark his answer choice to objective questions without providing any prior visual evidence as to which of the choices is the correct answer.

Still another object is to provide a device which requires the user to respond to an objective question by making an overt act, namely by placing a mark on a paper and instantly providing the user with knowledge as to whether his answer choice was correct or incorrect thereby providing maximum positive reinforcement and preventing negative learning.

A further object is to provide a device enabling the user to quickly find the correct answer choice if his previous answer choice was incorrect.

A still further object is to provide a device which is self-correcting thereby freeing professional instructors for teaching rather than administrative duties.

Another object is to provide a device as characterized above which is inexpensive and easy to use by all from the lowest to the highest grade level.

Still another object is to provide a device which is versatile and may be used for the adjunctive programing of new or existing texts, pamphlets, training films, programs and lectures.

A still further object is to provide a response mode which may be used in programed instruction whether it be in the form of printed tests, pamphlets or audio visually multi-paced learning systems or educational and instructional television.

The invention possesses other objects and features of advantage, some of which of the foregoing will be set forth in the following description of the preferred form of the invention which is illustrated in the drawing accompanying and forming part of this specification. It is to be understood, however, that variations in the showing made by the said drawing and description may be adopted within the scope of the invention as set forth in the claims.

Referring to the drawing.

Figures 1, 2:
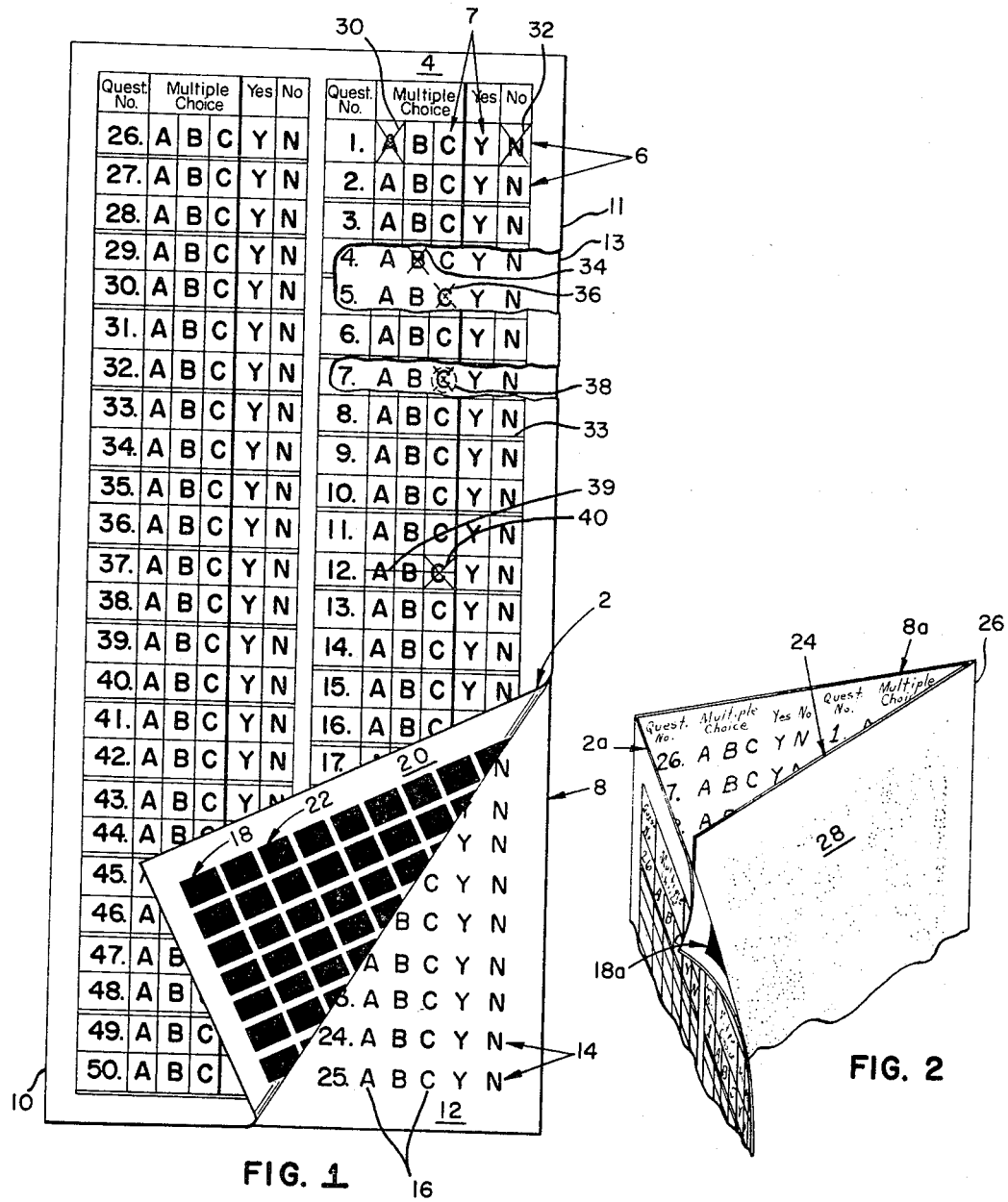
FIGURE 1 is a plan view of the device with a portion folded back to reveal representative portions of other parts of the device and with portions broken away to reveal such other parts of the device.
FIGURE 2 is a perspective view of a portion of a modified form of the device.

The invention consists briefly of a multiple choice response indicating and instant self-correcting device comprising: A first paper sheet 2 including on its top face surface 4 a plurality of sets of marking stations 6, each set of stations having indicia marks 7 representing possible responses to one of a plurality of multiple choice test questions; a second paper sheet 8 connected to and underlying the first sheet and including on its top face surface 12 a plurality of stations 14 and indicia marks 16 corresponding and registering with the first named station and indicia marks; pressure sensitive color reproducing means 18 on the underside 20 of the first paper sheet in registry with the marking stations representative of correct responses; non-reproducing means 22 on the underside of the first paper sheet in registry with the marking stations representing incorrect responses; and the reproducing and non-reproducing means being substantially visually indistinguishable.

In practice, the first sheet is printed with a series of numbers; here shown as numbers 1 through 50: Beside each number are a plurality of blocks within which there may be a letter, a number, a part of a word, a word, a combination of words, or any other arbitrary symbol. The number of letters, numbers, words or symbols is immaterial to the invention and there are three blocks here shown bearing the letters "A," "B," and "C." Thus a person using the device would have three choices in answering a single question. At each numbered station there are also two more blocks bearing the letters "Y" and "N." This permits answering a second question with two choices and is also designed for paced programs in which the fast learners are able to answer two questions or multiples thereof while the slower learners only answer one.

Symbols such as pictures could be used in training students who are unable to read letters.

The first and second sheets may be connected to one another in any manner such as by staples, adhesives, etc., or simply being one sheet folded at a crease-line 10 so that each set of stations and indicia marks on the first sheet are in registration with the stations and indicia marks on the second sheet. It should be noted that the sheets are connected so that the user of the device may easily turn to the second sheet to check his answers for correctness. As an aid to the user in grasping the first sheet 2, it may be made so as to provide an edge 11 which slightly overlaps edge 13 of sheet 8. The registration of the two sheets is not a critical tolerance and may be easily attained by machine folding paper.

The pressure sensitive color reproducing means is indicated at 18 and consists essentially of an area covered by a reproducing carbon ink. Such carbon inks are standard available items and should preferably be of a type and quantity which do not rub off or smear under light pressure.

The non-reproducing means is here shown as areas 22 covering the back side 20 of the first sheet. The non-reproducing means is dictated by the materials used in the reproducing means. Thus, if the reproducing means has a white color then the non-reproducing means must also be white. Likewise, if the reproducing means is transparent and does not discolor the paper, then the non-reproducing means could be merely that area of the paper which is not impregnated with pressure sensitive color reproducing means. As a practical mattter, the reproducing means is a black carbonizing ink and therefore the non-reproducing means is a color matched non-reproducing ink. I have found that the color of the ink may be matched to the carbon ink by dry grinding oxidizing oil type inks. The methods of matching the colors of inks are standard well-known procedures by those skilled in the art, thus by matching the colors of the reproducing and non-reproducing inks, it is impossible to detect which choice is the correct answer. It must be also understood that the surface treatment is important so that there will be no discernible gloss or sheen to differentiate between the carbon ink and the regular ink.

Various methods may be employed in printing the sheets. It is generally preferable, however, to print the non-reproducing ink on side 4 of the first sheet, by means of any type of press. Next, side 20 and side 12 are printed with non-reproducing black ink by means of a letterpress. Lastly, the carbon ink is printed on side 20 by means of a letterpress. The use of a letterpress is at present the most accurate means of matching the color of the carbon ink to the regular non-reproducing ink.

A modified form of the invention is shown in FIGURE 2 and is characterized mainly by the third sheet 24 interposed between the first sheet 2a and the second sheet 8a. The third sheet having a color masking inadvertent markings of the reproducing means 18a upon the third sheet. Sheet 24 may either be a separate insert of colored paper or most practically is a folded insert connected at edge 26 to sheet 8a and having a printed mottled or solid color surface approximately matching the reproducing means 18a.

The folded insert page 24 makes it possible to process the device through a folding apparatus without printing the answers upon the second sheet 8. The fold out sheet 24 also permits the folding rollers to be set with greater pressure thereby insuring a neater and more accurate folding of the edges which results in greater registry of the stations and symbols printed on pages 2 and 8. Pages 2a and 8a are in all respects similar to pages 2 and 8 shown in FIGURE 1.

The device is primarily a teaching aid and used by a person to help him learn a given subject. As such the device does not have to be "cheat proof" and the primary concern is to prevent the user from easily ascertaining the correct answer without making an overt choice. Since the device also has use as a testing device, it is desirable to be able to make the device "cheat proof" and this is easily accomplished by using a soft book paper. The purpose of the soft book paper is to permanently record all indentations on one or both sheets made by a fingernail or other sharp object which does not ordinarily leave a colored marking. Thus, if a person should attempt to cheat by making a small dot with a blunt non-marking instrument in order to ascertain which of the stations was the correct answer, the indentation would be left in the paper thus indicating to the instructor that an attempt to cheat had been made.

In using the device, a question is read by the user or to him by an instructor or communicated to him by an audio visual device and the user indicates his answer in one of the three spaces designated "A," "B" or "C" adjacent question number 1 by making an "X" in one of the three spaces as shown by the mark 30. In a multi-paced program, a second question is provided and the user makes an "X" mark 32 in either the "Y" or "N" column. The remainder of the form is marked in like manner. It is to be noted that side 4 is divided into groups of two stations provided for four responses by means of double lines 33. This physical division of the sheet assists the user in correlating the answer sheet with the groups of questions being asked.

If the user marks the correct answer, the reproducing means 18 will leave a mark 34 as shown in question 4. If the user chooses an incorrect answer, no mark will be made upon side 12 of the second sheet. If the device is made of soft paper, however, an incorrect answer will not leave a colored mark such as the one represented by mark 34 but will show as an indentation in the paper as designated by dotted line 36 after question number 5.

The device permits the user to choose an answer, check it immediately and choose another possible response if the first was incorrect. He proceeds to choose answers until the reproducing means makes a colored mark upon the second sheet. A faster way of finding the correct answer is to have the user draw a line through all the symbols representing possible answer choices at a given station for a single question as shown by line 39 at question 12. The "X" 40 marked over the letter "C" represents a first incorrect response.

Where the device is used as a test, it will automatically indicate how many choices were necessary in order to arrive at a correct answer. The sides of sheets 2 and 8 can also be stapled together or otherwise sealed so that the student will not know when he has chosen a correct answer. If the student changes his mind, instructions can be printed on one side of the device informing him to circle the mark he wishes to change. The mark 38 would show up as an indentation in soft paper as shown by the dotted lines indicated after question 7 in space "C" and would also show as a full line on sheet face 4.

I claim:

1. A multiple choice response indicating and instant self correcting device comprising:
a first paper sheet including on its top face surface a plurality of sets of marking stations, each set of stations having indicia marks representing possible responses to one of a plurality of multiple choice test questions;
a second paper sheet connected to and underlying said first sheet and including on its top face surface a plurality of stations and indicia marks corresponding and registering with said first named stations and indicia marks;
pressure sensitive color reproducing means on the underside of said first paper sheet in registry with the marking stations representative of correct responses;
non-reproducing means on the underside of said first paper sheet in registry with the marking stations representing incorrect responses; and
said reproducing and non-reproducing means being substantially visually indistinguishable.

2. The device of claim 1 wherein:
said color reproducing means is a carbon ink.

3. The device of claim 1 comprising:
a third sheet interposed between said first and second sheets, said third sheet having a color masking inadvertent markings of said reproducing means upon said third sheet.

4. The device of claim 1 wherein:
at least one of said sheets is soft so as to leave an easily detectable indentation when subjected to localized pressure.

5. The device of claim 1 wherein:
each reproducing means includes a plurality of reproducing area providing for multi-paced response.

6. The device of claim 1 wherein:
said sets of marking stations are visually set apart into pre-selected groups for assisting the user in correlating the answer sheet with the groups of questions being asked.

References Cited by the Examiner
UNITED STATES PATENTS

| | | | |
|---|---|---|---|
| 1,705,657 | 3/1929 | Clapp et al. | 35—48 |
| 2,614,338 | 10/1952 | Clark | 35—48 |
| 2,618,866 | 11/1952 | Adams | 35—48 |
| 2,788,590 | 4/1957 | Ormsby | 35—48 |
| 3,086,300 | 4/1963 | Rugland et al. | 35—48 |

EUGENE R. CAPOZIO, *Primary Examiner.*